W. I. WHEELER.
TRANSMISSION MECHANISM.
APPLICATION FILED DEC. 31, 1920. RENEWED JAN. 7, 1922.
1,422,510.
Patented July 11, 1922.
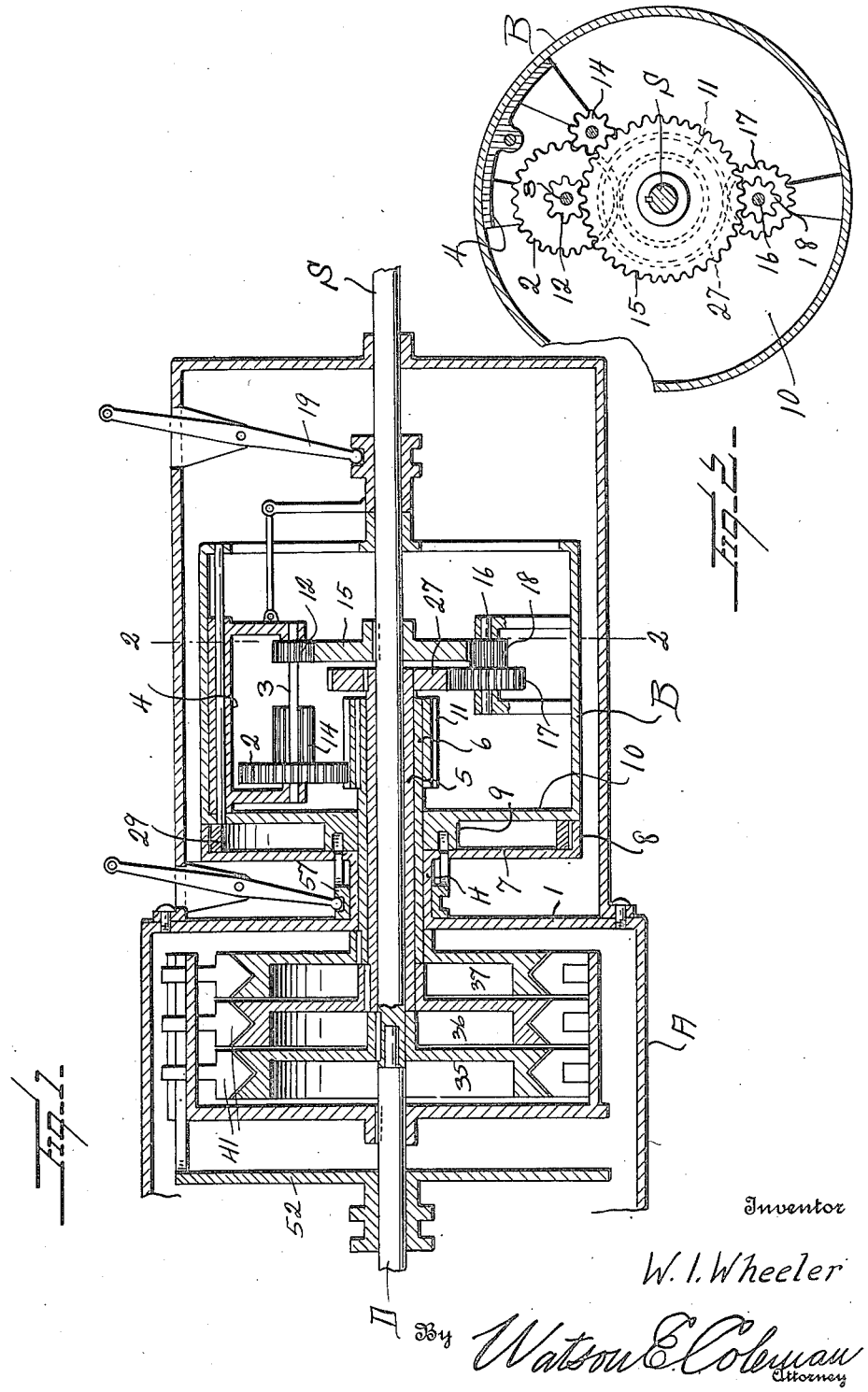
Inventor
W. I. Wheeler
By Watson E. Coleman
Attorney

UNITED STATES PATENT OFFICE.

WILLIAM I. WHEELER, OF SCOTTVILLE, ILLINOIS.

TRANSMISSION MECHANISM.

1,422,510.  Specification of Letters Patent.  Patented July 11, 1922.

Application filed December 31, 1920, Serial No. 434,256. Renewed January 7, 1922. Serial No. 527,765.

*To all whom it may concern:*

Be it known that I, WILLIAM I. WHEELER, a citizen of the United States, residing at Scottville, in the county of Macoupin and State of Illinois, have invented certain new and useful Improvements in Transmission Mechanisms, of which the following is a specification, reference being had to the accompanying drawings.

This invention relates to certain improvements in transmission mechanism and has relation more particularly to a mechanism of this general character of the type disclosed in my pending application, Serial No. 360,956, filed February 24, 1920, and it is an object of the invention to provide a novel and improved arrangement of parts whereby the driven shaft may be caused to rotate at different speeds and wherein a reverse speed may be readily and conveniently obtained.

The invention consists in the details of construction and in the combination and arrangement of the several parts of my improved transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary longitudinal sectional view with portions in elevation illustrating features of a transmission mechanism constructed in accordance with an embodiment of my invention, and Figure 2 is a sectional view taken substantially on the line 2—2 of Figure 1.

As disclosed in the accompanying drawings, D denotes the driving shaft of a motor vehicle supported in a conventional manner and which extends within the housing A. The end portion of the shaft D within the housing A is operatively engaged with an end portion of a driven shaft S, said shaft S being in longitudinal alinement with the shaft D.

Loosely mounted upon and surrounding the shaft S is an elongated sleeve 5 and surrounding the sleeve 5 and loosely mounted thereon is a second sleeve 6.

H denotes a hub surrounding the sleeve 6 and fixed to the web or partition 1 or otherwise held against rotation. The hub H is of desired length and its outer end portion is engaged with the axial center of a disc 7 provided at its periphery with the forwardly directed angular flange 8.

9 denotes a hub loosely mounted upon the sleeve 6 and concentric to the flange 8. The outer end portion of the hub 9 is provided with a plate 10, the periphery of which is provided with an outwardly directed drum B. The sleeve 6 in advance of the hub 9 is provided with a relatively broad gear 11.

The adjacent end of the sleeve 5 has fixed thereto a gear 27, said gear 27 constituting the second speed gear while the gear 11 constitutes the first speed gear. Fixed to the shaft S in close proximity to the gear 27 is a gear 15 preferably of a diameter in excess of the diameter of the gear 27.

Meshing with the gear 11 is a gear 2. The gear 2 is fixed to a shaft 3 rotatably supported by a carriage 4. The carriage 4 is supported by the wall of the drum or casing B for sliding movement in a direction longitudinally of the shaft S.

The shaft 3 has fixed thereto a gear 12 meshing with the gear 15 when the carriage 4 is in one position. When the carriage 4 is in a second position, a gear 14 meshes with the gear 15 to effect a reverse rotation of said shaft S. The gear 14 is rotatably supported by the carriage 4 and is relatively broad and constantly in mesh with the gear 2.

Rotatably supported by the drum or housing B at a point diametrically opposed to the carriage 4 is a shaft 16 provided with a gear 17 adapted to mesh with the gear 27. The shaft 16 is also provided with a gear 18 which meshes with the gear 15, so that the shaft S may be caused to rotate at a second or intermediate speed.

19 denotes an actuating mechanism for the carriage 4 and which mechanism may be operated in any desired manner.

The flange 8 of the disc or plate 7 constitutes a brake drum and with which coacts an expansible brake element 29 of a type particularly disclosed in my pending application, Serial No. 360,956, hereinbefore referred to.

Fixed to adjacent end portions of the shaft S, the sleeve 5 and the sleeve 6, respectively, are the wheels 35, 36 and 37. Coacting with each of these wheels are the braking elements 41 arranged and operating in a manner particularly disclosed in my pending application, Serial No. 360,956, said band or brake sections being under control of the operating arm or member 52. When the wheel 36 is locked, the shaft S is driven at second or intermediate speed and when the wheel 37 is locked, the shaft S rotates at first speed or low. When the wheel 35 is locked, the shaft S rotates in third or high speed.

When it is desired to effect a reverse speed or rotation of the shaft S, the hub 9 is locked against rotation by a sleeve 57 slidably mounted upon the hub H, although I do not wish to be understood as limiting myself in this respect as other means may be employed for holding the hub 9 against rotation, such as a band arranged for gripping action on the drum B.

From the foregoing description it is thought to be obvious that a transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A transmission mechanism including a drive shaft, a driven shaft, a gear fixed on the driven shaft, a sleeve surrounding the driven shaft and provided with a gear, a gear assembly operatively connecting the gear of the sleeve and the gear of the driven shaft, a second sleeve surrounding the first sleeve and provided with a gear, a gear assembly operatively connecting the gear of the second sleeve and the gear of the driven shaft, coacting clutch mechanisms carried by the drive shaft and the driven shaft and each of the sleeves, a member supported for rotation around the driven shaft and carrying the gear assemblies, and means for locking said member against rotation, one of said gear assemblies being supported for movement in a direction lengthwise of the driven shaft and including reversely rotating gears, one of said gears meshing with the gear of the driven shaft when said assembly is in one position and the second of said gears meshing with the gear of the driven shaft when said assembly is in a second position.

2. A transmission mechanism including a drive shaft, a driven shaft, a gear fixed on the driven shaft, a sleeve surrounding the driven shaft and provided with a gear, a gear assembly operatively connecting the gear of the sleeve and the gear of the driven shaft, a second sleeve surrounding the first sleeve and provided with a gear, a gear assembly operatively connecting the gear of the second sleeve and the gear of the driven shaft, coacting clutch mechanisms carried by the drive shaft and the driven shaft and each of the sleeves, a member supported for rotation around the driven shaft and carrying the gear assemblies, means for locking said member against rotation, one of said gear assemblies being supported for movement in a direction lengthwise of the driven shaft and including reversely rotating gears, one of said gears meshing with the gear of the driven shaft when said assembly is in one position and the second of said gears meshing with the gear of the driven shaft when said assembly is in a second position, and means operable at will for imparting movement to said gear assembly.

In testimony whereof I hereunto affix my signature.

WILLIAM I. WHEELER.